United States Patent
Porcel Magnusson

(10) Patent No.: US 12,025,706 B2
(45) Date of Patent: Jul. 2, 2024

(54) HIGHLY IDENTIFIABLE MATERIAL, METHOD FOR MANUFACTURING AND METHOD FOR DETECTION

(71) Applicant: SKANSENSE S.L.U., Madrid (ES)

(72) Inventor: Cristina Porcel Magnusson, Madrid (ES)

(73) Assignee: SKANSENSE S.L.U., Madrid (ES)

(*) Notice: Subject to any disclaimer, the term of this patent is extended or adjusted under 35 U.S.C. 154(b) by 540 days.

(21) Appl. No.: 17/262,993

(22) PCT Filed: Jul. 9, 2019

(86) PCT No.: PCT/EP2019/068333
§ 371 (c)(1),
(2) Date: Jan. 25, 2021

(87) PCT Pub. No.: WO2020/020627
PCT Pub. Date: Jan. 30, 2020

(65) Prior Publication Data
US 2021/0165099 A1   Jun. 3, 2021

(30) Foreign Application Priority Data

Jul. 24, 2018 (EP) .................................. 18382554

(51) Int. Cl.
G06K 7/00 (2006.01)
G01S 13/75 (2006.01)
G01S 17/74 (2006.01)

(52) U.S. Cl.
CPC ............ G01S 17/74 (2013.01); G01S 13/753 (2013.01)

(58) Field of Classification Search
CPC ............ G06K 19/06046; G06K 7/1447; G01S 17/10; G01S 7/4815; G01S 7/411;
(Continued)

(56) References Cited

U.S. PATENT DOCUMENTS

2001/0016051 A1* 8/2001 Rhoads ................ G06K 7/1439
707/E17.112
2002/0122878 A1* 9/2002 Kerns .............. G06K 19/06009
427/256
(Continued)

FOREIGN PATENT DOCUMENTS

DE   102007058888   6/2009
WO   2017067824   4/2017

OTHER PUBLICATIONS

Antonio Grillo et al: "High Capacity Colored Two Dimensional codes", Computer Science and Information Technology (IMCSIT), Proceedings of the 2010 International Multiconference on, IEEE, Piscataway, NJ, USA, Oct. 18, 2010 (Oct. 18, 2010), pp. 709-716, XP031843481, ISBN: 978-1-4244-6432-6, abstract; figure 7, pp. 710 .715, p. 716.

(Continued)

Primary Examiner — Daniel St Cyr
(74) Attorney, Agent, or Firm — FRESH IP PLC; Clifford D. Hyra; Aubrey Y. Chen

(57) ABSTRACT

Disclosed herein is a highly identifiable material that includes a physical body with an original spectral signature and an artificial tag incorporated on the physical body, which modifies the original spectral signature of the body. The artificial tag is configured to emit passively at least two spectral signatures in response to a source of energy received by the artificial tag. The spectral signatures are signals of interest for imaging technology. The artificial tag spectrally codifies all the information necessary to detect and/or identify a first predetermined feature of the highly identifiable material. The artificial tag may include a spatial pattern, and the spatial pattern may include a predetermined combination of the at least two spectral signatures. Also disclosed herein (Continued)

is a method for manufacturing such a material and a method for identifying such a material.

25 Claims, 2 Drawing Sheets

(58) Field of Classification Search
CPC .... G01S 7/4817; G01S 7/4863; G01S 13/887; G01S 17/74; G01S 17/66
USPC .......................................... 235/485, 385, 435
See application file for complete search history.

(56) References Cited

U.S. PATENT DOCUMENTS

| | | | |
|---|---|---|---|
| 2005/0196013 A1* | 9/2005 | Rhoads ................. | G06V 30/40 |
| | | | 704/E19.009 |
| 2009/0065583 A1 | 3/2009 | McGrew | |
| 2012/0035884 A1* | 2/2012 | Ingram ................. | G06F 17/18 |
| | | | 702/181 |
| 2012/0035900 A1* | 2/2012 | Ingram ................. | G01S 7/411 |
| | | | 702/181 |
| 2013/0228619 A1* | 9/2013 | Soborski ............. | G07D 7/0043 |
| | | | 235/462.25 |

OTHER PUBLICATIONS

Search Report for International Patent Application PCT/EP2019/068333, dated Jan. 30, 2020.

* cited by examiner

HIGHLY IDENTIFIABLE MATERIAL, METHOD FOR MANUFACTURING AND METHOD FOR DETECTION

FIELD OF THE INVENTION

The present invention belongs to the field of highly identifiable materials, especially those used when a high detectability is needed. The invention is also related to the methods for creating and detecting them.

BACKGROUND

Artificial vision is becoming growingly important in all technology areas. Different machines carry out tasks which are based in the perception of their environment. Assembly lines, laboratories, emergency rescue systems or just artificial intelligence prototypes make use of this feature.

Efforts are being put in improving the sensors and the algorithms involved in artificial vision, so that objects are being detected and identified with the ability of a human eye but with a much higher precision.

Since technology advances and new materials and processes are found, this process have been growing in accuracy, but objects which are detected by these devices still need to fulfil some requirements in order to be identified. For example, security documents, such as banknotes, may incorporate security codes, but must be flat enough so that these security codes are identified by an artificial vision machine.

A new way of characterizing materials so as to improve machine accessibility to visualize them is therefore sought.

SUMMARY OF THE INVENTION

An alternative solution for the aforementioned problem is provided by a highly identifiable material as disclosed herein, a method for manufacturing as disclosed herein, and a method for detecting as disclosed herein. Particular embodiments of the invention are defined by dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a highly identifiable material comprising a physical body with an original spectral signature and an artificial tag incorporated on the physical body, which modifies the original spectral signature of the body, wherein
- the artificial tag is configured to emit passively at least two spectral signatures in response to a source of energy received by the artificial tag;
- the spectral signatures are signals of interest for imaging technology;
- the artificial tag spectrally codifies all the information necessary to detect and/or identify a first predetermined feature of the highly identifiable material; and
- the artificial tag comprises a spatial pattern, the spatial pattern comprising a predetermined combination of the at least two spectral signatures.

The two spectral signatures may be incorporated into one final spectral signature, which is obtained from signatures of interest for imaging technologies in two ranges of the spectrum, e.g. one in the infrared and the other in the radar spectrum.

The reference spectral signature may be a non-specific spectral signal, and may proceed from natural sources, such as solar energy, or may be specific from artificial sources, such as an infrared signal. In any case, it is not necessarily engineered, but may come from any energy source.

The term "detection" is related to the action of discerning a material from others, while the term "identification" is related to further information levels, usually related to discerning one device from a different one which is similar to the first one.

The word "incorporated" makes reference to spectral values that have been engineered to modify the original spectral signature of a material or target to allow and/or enhance the detection and/or identification by sensors.

A signal which is of "interest for imaging technology" refers to a signal which may be identifiable by a sensor as distinctive and carrier of relevant information. One possible example is related to values which are specific enough (i.e., in terms of resolution or position in the spectrum) for the state of the art in sensor technology. Other possible example is related to outlier values, which are statistically unexpected for the object or the area of interest in the state of the art. Further, they may be values with sufficiently accurate spectral peaks in term of resolution and/or gain, such as a signal with a reflectance higher than 40% in a NIR or SWIR wavelength with a bandwidth around 20 nm shown on a non-white visible object, i.e., a dark-coloured object (which is not expected to show relevant signals in NIR or SWIR).

The fact that the spectral tag only emits a spectral signature when receives an external source of energy refers to the fact that the spectral tag is passive, and only reflects spectral information in response to an external source. This external source may be any type of spectral emitter, either passive (sunlight) or active (laser light, lidar or a signal emitted by a radar device).

The artificial tag spectrally codifies all the information necessary for detecting or identifying a particular feature, without the need of performing an analysis of the physical body itself or of the tag in terms of position of its elements. As a consequence, there is no need that the artificial tag or the spectral signatures are positioned in a particular location of the tag or the body, as opposite to Bidi or barcodes, where the position of the elements codifying the information is key to perform the analysis. These known coding systems therefore need reference points (position and alignment markers) in the tag to calculate the position of the information of the tag and thus obtain the information encoded thereby.

On the contrary, in this invention, the position of the spectral signatures in the tag is not relevant, the mere features of the spectral signatures are enough, without being combined with positioning features, to identify the relevant feature.

The spectral codification in this invention should be understood as any operation performed with spectral features of the spectral tag, including the sequence order (without the need of positioning versus markers or reference points), spatial distribution and/or the relative abundance of the spectral signatures. All of these operations may be used and are considered spectral information in this invention.

Obviously, this does not mean that this spectral tag may not be combined with other types of information, but the fact is that it is not necessary.

The spatial pattern provides additional information for the spectral codification, which allows not only detection, but also identification of the physical body, or any other further information related to it.

Spectral codification refers to the fact that a predetermined feature of the physical body is chosen to be encoded, and the artificial tag comprises a particular combination of spectral signatures which may be interpreted as encoding this predetermined feature.

In some particular embodiments, the spatial pattern comprises a combination of the at least two spectral signatures which is repeated more than two times in the artificial tag, in such a way that the combination codifies the information.

These embodiments introduce a redundant repetition of the spectral signatures through the artificial tag. Redundancy should be understood in the sense of the information of the spatial pattern being repeated more than once. This redundancy causes the spectral signatures to be recognized without the need of locating the position of the information with reference points, as, e.g., position markers and alignment markers in QR codes. Spatial redundancy is especially advantageous in 3D embodiments.

In some particular embodiments, the information codified by the spatial pattern is defined in terms of proportion of surface or relative abundance of each of the artificial spectral signatures on the artificial tag.

The proportion of the surface does not depend on any reference point, so the information provided by this spatial pattern may be identified without needing any reference point. Further, in this example, the shape of the spatial pattern is not relevant to the analysis, but only the relative abundance of each spectral signature.

In some particular embodiments, the information codified by the spatial pattern is defined in terms of the relative position or sequence order of the artificial spectral signatures belonging to that artificial spectral tag.

The relative position of the spectral signatures does not depend on any reference point, so the information provided by this spatial pattern may be identified without needing any reference point.

In some particular embodiments, the information codified by the spatial pattern is defined in terms of the spatial distribution of the artificial spectral signatures belonging to that artificial tag.

In this particular embodiment, spatial distribution of the spectral signatures may refer to the establishment of a pattern wherein the spatial distribution of each spectral signature has been engineered to be read by a sensor, for example adapted to certain 3D object. The size and distribution of the spectral signatures may be customized to enhance the detection of certain shapes in certain environments by predetermined sensors. For example, the spatial pattern and spectral signature distribution may be adapted for the detection of a vehicle by another vehicle sensor.

In some particular embodiments, the information codified by the spatial pattern is defined in terms of the shape of the artificial spectral signatures belonging to that artificial tag. In other particular embodiments, the information codified by the spatial pattern is defined in terms of a relationship between the spectral signature values and features of the spatial pattern belonging to that artificial tag, which in particular cases may be a mathematical relationship between the spectral signature wavelength and the area occupied in the tag.

In some particular embodiments, the artificial tag is three-dimensional.

The artificial tag is not subject to be in a plane to be detected, since the position of the tag is not relevant due to pattern redundancy. As a consequence, although it is deformed, incomplete or damaged, it provides the necessary information to identify the feature that it encodes.

In the case of embodiments where the artificial tag is three-dimensional and information is codified by the spatial pattern in terms of proportion of surface or relative abundance of each of the artificial spectral signatures on the artificial tag, there is a synergy between these two features, since in these embodiments, spectral analysis is far easier than in standard three-dimensional objects, due to the fact that the spatial pattern is repeated, so it may be detected regardless the shape of the physical body. Further, the physical body may be damaged, deformed or even incomplete, and none of these issues would make this detection impossible.

In some particular embodiments, at least one of the spectral signatures belongs to the non-visible spectrum, and particularly to the infrared, radar and/or microwave spectrum.

The non-visible spectrum comprises electromagnetic radiation with a wavelength greater than 750 nm.

The fact that the signal belongs to the non-visible spectrum refers to the signal belonging to the infrared spectrum, the micro spectrum or the radio spectrum. Radar and infrared spectrum are particularly advantageous examples for this feature.

In some particular embodiments, at least one of the spectral signatures belongs to the infrared spectrum and at least one of the spectral signatures belongs to the radar spectrum.

In some particular embodiments, the spectral signatures are suitable for being detected by artificial detection means.

This means that the spectral signatures are signals which may be detected by artificial detection means as known by the skilled person, such as lidar devices, multispectral or infrared cameras, radars or beacon receivers.

In some particular embodiments, the spectral signatures are suitable for being detected by automated or semi-automated processes.

This means that the spectral signatures are signals which may be detected by automated or semi-automated processes as known by the skilled person, such as image recognition software, artificial intelligence methods or automated surveillance systems.

In some particular embodiments, the spatial pattern is engineered to provide particular information about a feature of the physical body.

The spectral pattern is therefore carefully chosen to provide useful information, which allows distinguishing this particular physical body.

In some particular embodiments, the artificial spectral tag comprises a coating, a paint, a sticker or is embedded in the physical body of the material.

These are advantageous ways of incorporating the spectral tag into a physical body.

In some particular embodiments, the spectral signature is caused by at least one of a pigment, a resin, nanoparticles, crystal or conductive particles.

Pigments and resins are materials that allow the creation of spectral signatures of interest for imaging technologies. As well nanoparticles, quantum dots and crystals like rare earth crystals are emerging materials that facilitate the creation of engineered spectral signatures mainly in the optical spectrum. Conductive particles like metal particles may be included in coatings but also in conductive plastics and other materials to create spectral signatures of interest mainly in the radar spectrum. In some particular embodiments, the spectral signature is caused by at least one of a conductive material, oriented conductive particles, metal particles, a radar enhancing material or a radar reflector or is caused by surface features like the texture or roughness of the artificial tag.

The spectral signature may be caused by standard conductive materials like metals, but also by other materials, like conductive plastics. In other embodiments, this spectral signature may be caused by surface properties, since some detectors, such as ones based in radar spectrum, may detect these surface properties and identify the artificial tag.

In some particular embodiments, at least two of the spectral signatures are arranged in different layers in the material.

This arrangement increases the possibility of creating three-dimensional spectral codes, since the combination of spectral signatures in different layers produce particular combinations which depend on the nature of the spectral signatures: they may be added or subtracted, therefore creating new spectral signatures as a result of the same.

In some particular embodiments, the highly identifiable material is suitable for use in mobility technologies, such as vehicles, infrastructure and/or crash avoidance systems for an optimized vehicle conspicuity. In some particular embodiments, the highly identifiable material is suitable for use in search and rescue equipment or in emergency materials or in high visibility wear or materials or in occupational wear or materials. In some particular embodiments, the highly identifiable material is suitable for use in assets management, such as containers, pallets or pooling equipment.

In a second inventive aspect, the invention provides a method for manufacturing a highly identifiable material according to the first inventive aspect, the method comprising the steps of defining at least a first feature to be detected;

associating a first spectral signature or a first artificial tag to the first feature; and incorporating the first artificial tag or a first artificial tag configured to emit the first spectral signature into a physical body, wherein the first spectral signature belongs to the non-visible spectrum, thus creating a highly identifiable material suitable for use in automated search and rescue equipment or in emergency materials or in high visibility wear or materials or in occupational wear or materials, or in assets management, such as containers, pallets or pooling equipment, or in mobility technologies, such as vehicles and infrastructure and/or crash avoidance systems which use artificial detection means and an optimized vehicle conspicuity.

According to this method, a highly identifiable material as discussed above may be obtained. This material may be advantageously used for the aforementioned applications.

In some particular embodiments, the method further comprises the step of choosing a predetermined spectral profile for each of the spectral signatures, wherein each predetermined spectral profile represents one particular feature of the material and/or the physical body, such as a final user, product model or manufacturer.

In these embodiments, the features of the physical body may be easily identified by automated sensors, thus making it easy the detection and/or identification process.

In a further inventive step, the invention provides a method for detecting a highly identifiable material according to the first inventive aspect, comprising the steps of performing a spectral analysis of a region of interest in order to detect the highly identifiable material; and detecting a first spectral signature belonging to the highly identifiable material.

In some particular embodiments, the method further comprises at least one of the following steps measuring the relative abundance of at least two different spectral signatures;

detecting the relative position of at least two spectral signatures;

detecting certain order and/or sequence of at least two spectral signatures;

detecting certain spatial distribution of at least two spectral signatures;

detecting certain shapes of at least two spectral signatures; and/or detecting a spatial pattern from the spectral analysis;

detecting a relation between one of the spectral signatures and the area covered by the spectral signature and/or de shape of the spectral signature and/or the spatial distribution of the spectral signature;

thus extracting information about the highly identifiable material.

In some particular embodiments, the method further comprises the step of acquiring metadata related to at least one of the following:

geopositioning data and/or time of acquisition of the first spectral signature; and geopositioning data of a sensor device used to detect the first spectral signature.

In some particular embodiments, the method further comprises the step of linking at least one of the acquired metadata to the spectral analysis.

In some particular embodiments, the method further comprises the step of organizing the information using one of the acquired metadata as a classifying criterion, such as the geopositioning data of the first spectral signature, so that it is accessible by a user.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
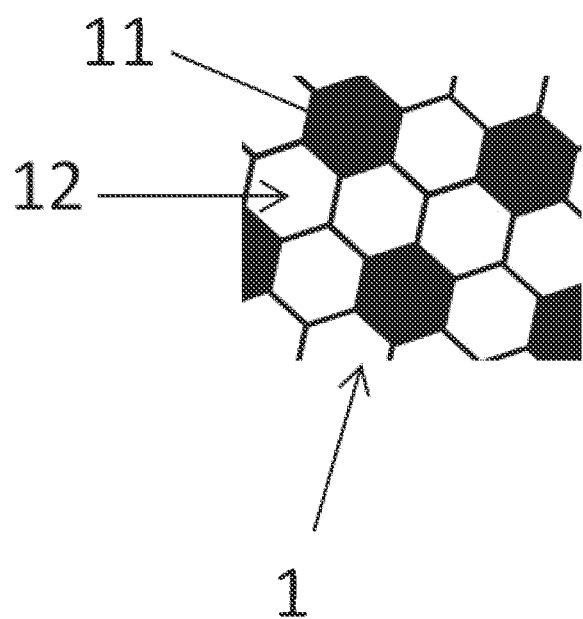
FIG. 1 shows a first embodiment of a two dimensional highly identifiable material according to the invention.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows a first embodiment of a highly identifiable material according to the invention. This material comprises a physical body 1, which in this case is a portion of a synthetic material, and a tag. The physical body 1 has an original spectral signature, which in this case corresponds to its original combination of colours, black and white. But in the case of the invention, an artificial tag has been incorporated into this physical body. For the sake of clarity, the artificial signatures of the artificial tag in this embodiment are represented as black and white too but do correspond to non-visible colours: a first infrared spectral signature 11 is incorporated into the black elements of the synthetic material and a second infrared spectral signature 12 is incorporated into the white elements of the synthetic material. In this figure, only a section of this synthetic material is shown, but the whole tag extends throughout the entire physical body 1.

This chosen combination of the two infrared signatures becomes a spatial pattern of polygons that is redundantly repeated. This spatial pattern is configured to emit passively the same predetermined combination of different artificial spectral signatures in response to a source of energy. This makes the artificial tag codify all the information necessary to detect and/or identify any object made with this physical body including the tag. For example, this tag and infrared spectral and polygon pattern may be incorporated in a vehicle in order to be identified later by a sensor. The pattern may be applied to a two dimensional physical body like in FIG. 1 for example to identify a vehicle flat part like an identification plate, but may be also applied three dimensionally for example to the full body of a vehicle.

As may be seen in the figure, in this case, the information codified by the spatial pattern is defined in terms of proportion of surface or relative abundance of each of the artificial spectral signatures 11, 12 on the artificial tag. The surface covered by each one of these spectral signatures in the polygons may follow for example a 1:2 ratio between the first infrared signature 11 and the second infrared signature 12.

Further, the information codified by the spatial pattern is defined in terms of the spatial distribution of the artificial spectral signatures belonging to that artificial tag, since a single portion comprising the first infrared signature 11 is completely surrounded by a crown of the second infrared signature 12.

Further, the information codified by the spatial pattern is defined in terms of the shape of the artificial spectral signatures belonging to that artificial tag. The fact that the shape of the single portion comprising the first infrared signature 11 is pentagonal and the crown of the second infrared signature 12 surrounding each portion of the first infrared signature 11 comprises five hexagons is distinctive enough. Choosing different shapes for the non-visible spectral signatures may lead to different information about the object. As a consequence, the same design appearance may be used in different applications, and the non-visible artificial tag is used to identify each particular application, since the appearance is not.

In other embodiments, the information codified by the spatial pattern may also be defined in terms of a relationship between the spectral signature values and features of the spatial pattern belonging to that artificial tag. For example, a first infrared wavelength of 905 nm associated with the extension of the surface of the signature, a squared shape of 905 cm2 may mean a particular information about the object.

In this case, the spectral signatures have been printed on the surface of the physical body, thus creating the highly detectable material. Ink is applied on the surface of the body by a printer. However, in different embodiments, other methods may be used to achieve this feature, such as the use of a coating or a sticker including a pigment, a resin, nanoparticles, crystal or conductive particles.

Figure 2:
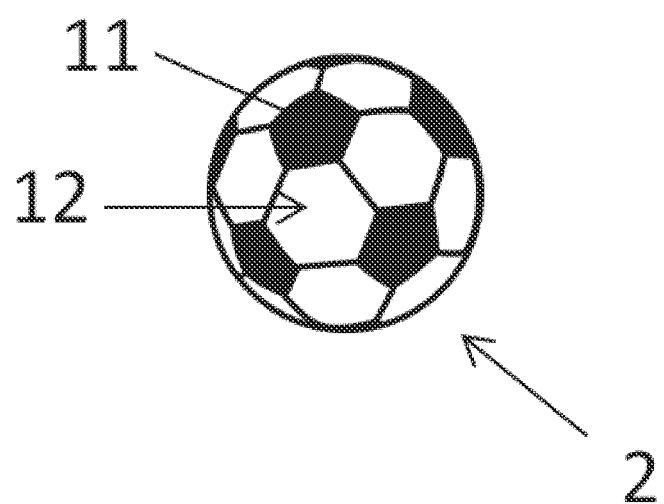
FIG. 2 shows the same material as in FIG. 1 applied to a three dimensional physical body.

FIG. 2 shows a particular example of the highly identifiable material shown in FIG. 1 applied to a three dimensional object.

The information provided by the artificial tag is substantially the same regardless of the orientation of the object 2.

Figure 3:
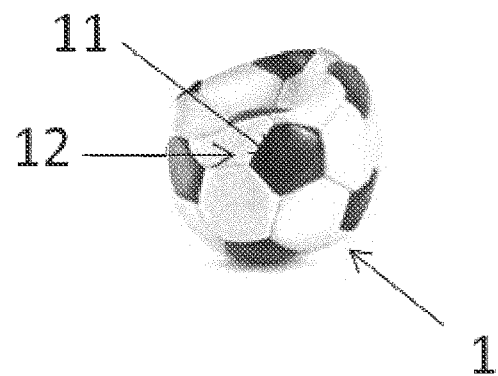
FIG. 3 the same material as in FIG. 1 applied to a damaged three dimensional physical body

FIG. 3 shows a particular example of this material when the physical body 1 has been damaged or its image or sensing information is incomplete. Despite the heavy deformation of the highly identifiable material with respect to the original three-dimensional tag shown in FIG. 2, it is possible to identify the proportion of each spectral signature in a spectral analysis and verify that the spectral histograms of each of the three spectral tags shown in FIGS. 1, 2 and 3 are equivalent.

Although only one layer of printed material has been deposited on the physical body, in different embodiments of the invention, there may be different layers which comprise different spectral signatures.

Figure 4:
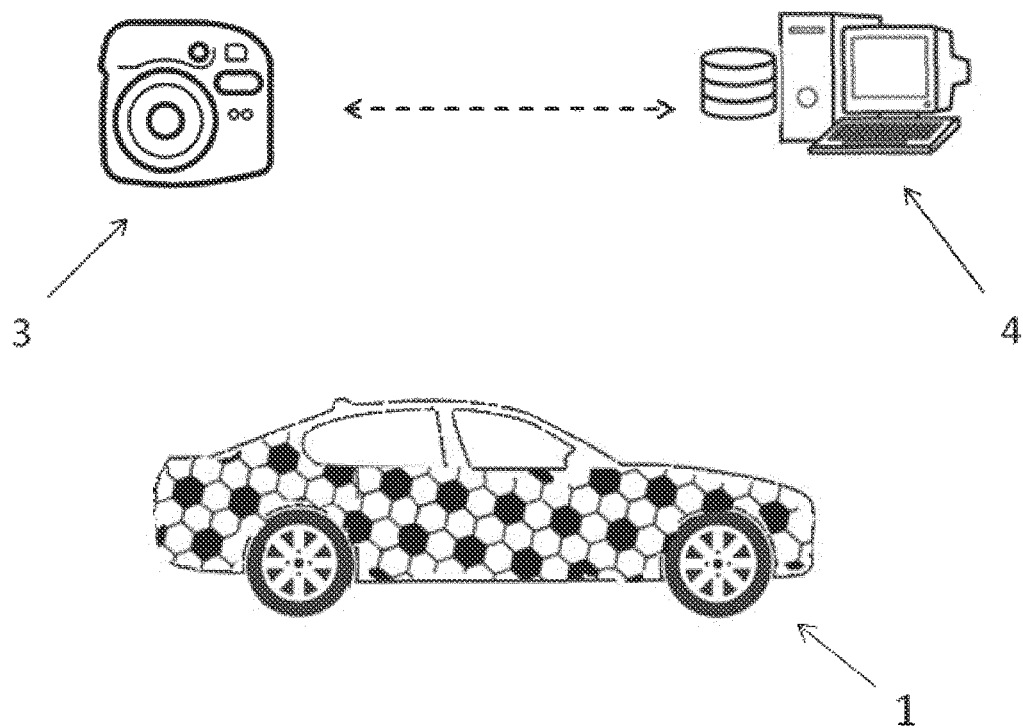
FIG. 4 shows a particular step of an embodiment of a method of detection according to the invention.

FIG. 4 shows a particular embodiment of a method according to the invention. In this method, the physical body 1 is a car, This car comprises the tag shown in FIG. 1, with a redundant spectral pattern. Again the black and white polygons represent two different non-visible infrared spectral signatures. In this case, the features of a particular vehicle may be codified by a non-visible artificial tag which is incorporated in the coating of the bumper, the corners or the whole body of the vehicle.

This spectral pattern is repeated so as to provide a redundant combination. As has been mentioned above, even in the event that the tag is incomplete, damaged, deformed or even broken, and regardless the orientation thereof, the artificial tag may be detected by an automated sensor, so as to determine the presence and features of this particular highly identifiable material.

This way the material may be used in mobility technologies such as vehicles, infrastructure and/or crash avoidance systems for an optimized vehicle and object conspicuity.

A method according to the invention would comprise the steps of defining a first feature to be detected, such as the model of the car;

associating a first spectral pattern to this feature; and incorporating the first spectral pattern in a material which is suitable for manufacturing a car, such as a coating or a sticker which contains this spectral pattern.

The spectral pattern may be the one of FIG. 1, wherein each colour represents a different non-visible emission. The spectral pattern would therefore comprise a plurality of polygonal first spectral signatures and a plurality of polygonal second spectral signatures.

Obviously, in different embodiments, more than one feature may be associated to different spectral patterns, so that a single highly detectable material may contain a plurality of interesting data, such as the manufacturer, model year, batch, etc.

Regarding the way of detecting and managing the information obtained in this process, the sensor 3 detects a first spectral signature from the car 1 and some processing means 4 perform a spectral analysis measuring the amount of surface covered by different spectral signatures, such as in a conventional spectral histogram. Then, the information of the highly identifiable material is obtained from the spectral analysis. Since this spectral pattern refers to a particular feature or features of this material, this information is easily gathered.

Geopositioning data and/or time of acquisition of this first spectral signature is easily acquired and linked to this result, so that the position and the particular information of any object comprising the highly identifiable material may be easily classified and presented.

The invention claimed is:
1. A highly identifiable material comprising:
a physical body with an original spectral signature; and
an artificial tag incorporated on the physical body, which modifies the original spectral signature of the body, wherein:
the artificial tag is configured to emit passively at least two spectral signatures in response to a source of energy received by the artificial tag;
the spectral signatures are signals of interest for imaging technology;
the artificial tag spectrally codifies all the information necessary to detect and/or identify a first predetermined feature of the highly identifiable material;
the artificial tag comprises a spatial pattern, the spatial pattern comprising a predetermined combination of the at least two spectral signatures;
the at least two spectral signatures belong to the infrared spectrum and/or the radar spectrum;
the highly identifiable material is used in mobility technologies, the mobility technologies comprising vehicles, infrastructure, and/or crash avoidance systems for an optimized vehicle conspicuity;
the artificial tag is three-dimensional and remains detectable and/or identifiable when not in a single plane.
2. The highly identifiable material according to claim 1, wherein the spatial pattern comprises a combination of the at least two spectral signatures which is repeated more than two times in the artificial tag, in such a way that the combination codifies the information.
3. The highly identifiable material according to claim 2, wherein the information codified by the spatial pattern is defined in terms of proportion of surface or relative abundance of each of the artificial spectral signatures on the artificial tag.
4. The highly identifiable material according to claim 2, wherein the information codified by the spatial pattern is defined in terms of the relative position or sequence order of the artificial spectral signatures belonging to that artificial spectral tag.
5. The highly identifiable material according to claim 2, wherein the information codified by the spatial pattern is defined in terms of the spatial distribution of the artificial spectral signatures belonging to that artificial tag.

6. The highly identifiable material according to claim 2, wherein the information codified by the spatial pattern is defined in terms of the shape of the artificial spectral signatures belonging to that artificial tag.
7. The highly identifiable material according to claim 2, wherein the information codified by the spatial pattern is defined in terms of a relationship between the spectral signature values and features of the spatial pattern belonging to that artificial tag.
8. The highly identifiable material according to claim 1, wherein at least one of at least two spectral signatures belongs to the infrared spectrum, the radar spectrum, and/or the microwave spectrum.
9. The highly identifiable material according to claim 1, wherein at least a first of the at least two spectral signatures belongs to the infrared spectrum and at least a second of the at least two spectral signatures belongs to the radar spectrum.
10. The highly identifiable material according to claim 1, wherein the spectral signatures are suitable for being detected by artificial detectors.
11. The highly identifiable material according to claim 1, wherein the spectral signatures are suitable for being detected by automated or semi-automated processes.
12. The highly identifiable material according to claim 1, wherein the spatial pattern is engineered to provide particular information about a feature of the physical body.
13. The highly identifiable material according to claim 1, wherein the artificial spectral tag comprises a coating, a paint, a sticker or is embedded in the physical body of the material.
14. The highly identifiable material according to claim 1, wherein at least one of the spectral signatures is caused by at least one of a pigment, a resin, nanoparticles, crystal or conductive particles.
15. The highly identifiable material according to claim 1, wherein at least one of the spectral signatures is caused by at least one of a conductive material, oriented conductive particles, metal particles, a radar enhancing material or a radar reflector or is caused by surface features like the texture or roughness of the artificial tag.
16. The highly identifiable material according to claim 1, wherein at least two of the spectral signatures are arranged in different layers in the material.
17. The highly identifiable material according to claim 1, wherein the highly identifiable material is suitable for use in search and rescue equipment or in emergency materials or in high visibility wear or materials or in occupational wear or materials.
18. The highly identifiable material according to claim 1, wherein the highly identifiable material is suitable for use in assets management, such as containers, pallets or pooling equipment.
19. Method A method for manufacturing a highly identifiable material according to claim 1, the method comprising:
for a highly identifiable material comprising a physical body with an original spectral signature and an artificial tag incorporated on the physical body, which modifies the original spectral signature of the body, wherein:
the artificial tag is configured to emit passively at least two spectral signatures in response to a source of energy received by the artificial tag,
the spectral signatures are signals of interest for imaging technology,
the artificial tag spectrally codifies all the information necessary to detect and/or identify a first predetermined feature of the highly identifiable material, the artificial tag comprises a spatial pattern, the spatial pattern comprising a predetermined combination of the at least two spectral signatures, the at least two spectral signatures belong to the infrared spectrum and/or the radar spectrum, the highly identifiable material is used in mobility technologies, the mobility technologies comprising vehicles, infrastructure, and/or crash avoidance systems for an optimized vehicle conspicuity, the artificial tag is three-dimensional and remains detectable and/or identifiable when not in a single plane:

defining at least a first feature to be detected;

associating a first spectral signature or a first artificial tag to the first feature; and incorporating the first artificial tag or a first artificial tag configured to emit the first spectral signature into a physical body, wherein the first spectral signature belongs to the non-visible spectrum, thus creating a highly identifiable material suitable for use in automated search and rescue equipment or in emergency materials or in high visibility wear or materials or in occupational wear or materials, or in assets management, such as containers, pallets or pooling equipment, or in mobility technologies, such as vehicles and infrastructure and/or crash avoidance systems which use artificial detectors and an optimized vehicle conspicuity.

20. The method according to claim 19, further comprising:

choosing a predetermined spectral profile for each of the spectral signatures, wherein each predetermined spectral profile represents one particular feature of the material and/or the physical body, such as a final user, product model or manufacturer.

21. The method for detecting a highly identifiable material according to claim 19, the method comprising:

performing a spectral analysis of a region of interest in order to detect the highly identifiable material; and detecting a first spectral signature belonging to the highly identifiable material.

22. The method according to claim 21, further comprising at least one of:

measuring the relative abundance of at least two different spectral signatures;

detecting the relative position of at least two spectral signatures;

detecting certain order and/or sequence of at least two spectral signatures;

detecting certain spatial distribution of at least two spectral signatures;

detecting certain shapes of at least two spectral signatures;

detecting a spatial pattern from the spectral analysis; and detecting a relation between one of the spectral signatures and the area covered by the spectral signature and/or the shape of the spectral signature and/or the spatial distribution of the spectral signature;

thus extracting information about the highly identifiable material.

23. The method according to claim 21, further comprising:

acquiring metadata related to at least one of the following:

geopositioning data and/or time of acquisition of the first spectral signature; and geopositioning data of a sensor device used to detect the first spectral signature.

24. The method according to claim 23, further comprising:

linking at least one of the acquired metadata to the spectral analysis.

25. The method according to claim 23, further comprising:

organizing the information using one of the acquired metadata as a classifying criterion, such as the geopositioning data of the first spectral signature, so that it is accessible by a user.

\* \* \* \* \*